US011528329B2

(12) United States Patent
Gupta et al.

(10) Patent No.: US 11,528,329 B2
(45) Date of Patent: Dec. 13, 2022

(54) DYNAMIC PATH STEERING UTILIZING AUTOMATIC GENERATION OF USER THRESHOLD PROFILES

(71) Applicant: Hewlett Packard Enterprise Development LP, Houston, TX (US)

(72) Inventors: Gopal Gupta, Bangalore Karnataka (IN); Abhinesh Mishra, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/909,410

(22) Filed: Jun. 23, 2020

(65) Prior Publication Data
US 2021/0352151 A1 Nov. 11, 2021

(51) Int. Cl.
*H04L 67/148* (2022.01)
*H04L 67/025* (2022.01)
*H04L 67/1097* (2022.01)
*H04L 9/40* (2022.01)
*H04L 43/0882* (2022.01)
*H04L 45/50* (2022.01)
*H04L 43/16* (2022.01)
(Continued)

(52) U.S. Cl.
CPC ........ *H04L 67/148* (2013.01); *H04L 43/0882* (2013.01); *H04L 43/16* (2013.01); *H04L 45/50* (2013.01); *H04L 63/1416* (2013.01); *H04L 63/1425* (2013.01); *H04L 63/20* (2013.01); *H04L 67/01* (2022.05); *H04L 67/025* (2013.01); *H04L 67/1097* (2013.01); *H04L 67/61* (2022.05)

(58) Field of Classification Search
None
See application file for complete search history.

(56) References Cited

U.S. PATENT DOCUMENTS

| 8,570,861 B1 | 10/2013 | Brandwine |
| 10,142,164 B2 | 11/2018 | Ramachandran et al. |

(Continued)

OTHER PUBLICATIONS

Wikipedia, "Differentiated services", available online at <https://en.wikipedia.org/w/index.php?title=Differentiated_services&oldid=960085991>, Jun. 1, 2020, 8 pages.

(Continued)

*Primary Examiner* — Kevin S Mai
(74) *Attorney, Agent, or Firm* — Hewlett Packard Enterprise Patent Department

(57) ABSTRACT

Dynamic path steering utilizing automatic generation of user threshold profiles is described. An example of a storage medium includes instructions for obtaining a threshold policy for a first application, the threshold policy including a set of threshold values for operational parameters; generating a migration score for a first user, the migration score based at least in part on a user score for the first user; generating a set of secondary threshold values for the first user based at least in part on the migration score and the set of threshold values; enabling operation of the first application for the first user using a first network uplink; monitoring network parameter values in operation of the first application; and upon detecting an operational parameter value exceeding a secondary threshold value, migrating operation of the first application for the first user from the first network uplink to a second network uplink.

21 Claims, 6 Drawing Sheets

(51) Int. Cl.
*H04L 67/01* (2022.01)
*H04L 67/61* (2022.01)

(56) References Cited

U.S. PATENT DOCUMENTS

| | | |
|---|---|---|
| 2016/0036833 A1 | 2/2016 | Ardeli et al. |
| 2019/0150150 A1* | 5/2019 | Calin .................. H04L 43/026 370/329 |
| 2021/0120454 A1* | 4/2021 | Chennichetty ........ H04L 1/0033 |

OTHER PUBLICATIONS

Abrol, N., Link Load Balancing: ScaleAOn Dynamic Path Selection, (Research Paper), Jul. 10, 2019, 15 Pgs.
Dynamic WAN Selection (Web Page), Sep. 6, 2018, 5 Pgs.
Traffic-Based Steering Profiles and SD-WAN Policies Overview (Web Page), May 15, 2019, 7 Pgs.

\* cited by examiner

DYNAMIC PATH STEERING UTILIZING AUTOMATIC GENERATION OF USER THRESHOLD PROFILES

BACKGROUND

In SD-WAN (Software Defined Wide Area Network) operation, there may be multiple possible network uplinks, such as Internet or MPLS (Multi-Protocol Label Switching) network uplink. Each network uplink may provide differing qualities of service, depending on the current conditions.

In order to provide a best user experience, a particular network uplink of the multiple possible network uplinks may be chosen for an application. In a static policy operation, a selection may be set for a particular user group and a particular application, with, for example, a primary network uplink and a fallback network uplink being established for the user group and application. Under such a static policy, the operation of the application for the users will shift from the primary network uplink to the fallback network uplink upon network conditions deteriorating beyond particular threshold conditions.

However, in a static uplink policy all users in a group would migrate to the fallback network uplink at a same threshold condition. This switching operation may require significant overhead to handle migration of all users when network conditions deteriorate, and may not provide efficient use of the available network links.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
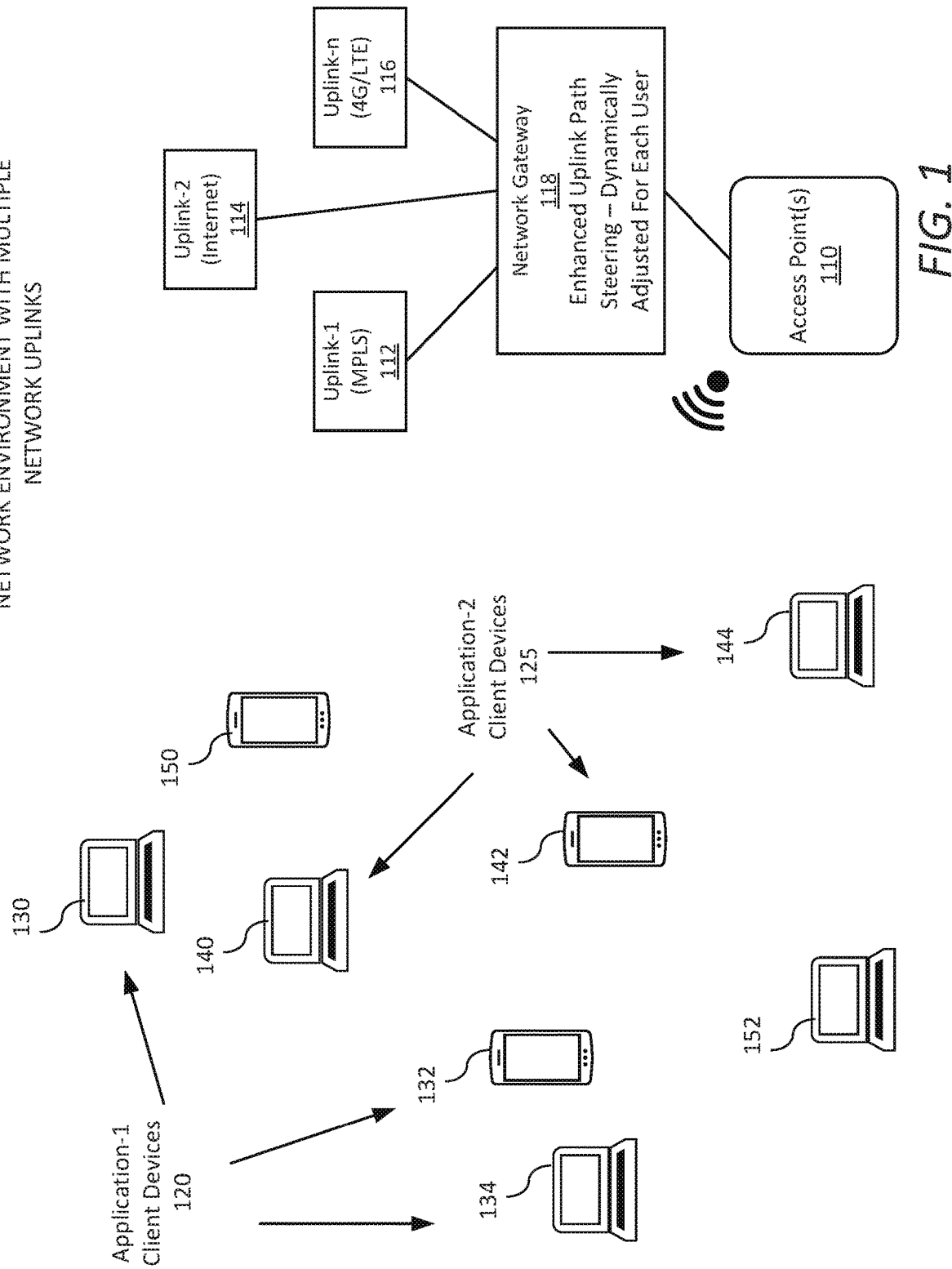
FIG. 1 is an illustration of a network environment including a access point providing enhanced dynamic path steering, according to some embodiments.

Embodiments described herein are directed to dynamic path steering utilizing automatic generation of user threshold profiles.

In SD-WAN Software Defined Wide Area Network) implementations, uplink path steering between network uplinks, also referred to herein as dynamic path steering (DPS), allows for avoidance of untoward network experience when a network link deteriorates. Dynamic path steering is achieved by developing and implementing policies based on threshold parameters and a set of uplinks to be used for an application. A dynamic path steering policy defines how sensitive the uplink health is for each application.

In an example operation, there may be multiple possible network uplinks available at an access point, wherein the network uplinks may include, for example, an Internet uplink and an MPLS (Multi-Protocol Label Switching) uplink. Each network uplink may provide differing qualities of service, depending on the current network conditions. In a conventional operation, uplink path steering policies may be formed manually for each application or application category by a network administrator, and applied for a group of users of that application. The policy thus remains static for all users under such policy as configured until the network administrator makes modifications to the policy. For example, in a particular example a static policy may provide the following policies:

1. <employee> <dst any> <proto> <sport> <dport> app <office365 app> path-steer <mpls link1> fallback <inet links> <threshold profile office365_prof> <probe profile office365_probe>
2. <guest> <dst any> <proto> <sport> <dport> app <enterprisecustom app1> path-steer <mpls links> fallback <inet links> <threshold profile enterprisecustom_prof> <probe profile customapp1_probe>

In this example, all employees will utilize policy number 1 and all guests will utilize policy number 2.

However, a static policy, as shown above, restricts the customization that is possible to be done for different users. Different users have different usage patterns and different business criticality requirements. For example, it may be desirable for a user who accesses malicious content to be treated differently compared to a user who accesses business critical content most of the time. It is not practical to manually configure different policies for different users in a large operation because of number of users involved and because the parameters related to user behavior are constantly changing. The static DPS policy thus will be limited in operation as it provides that all users of a user group are to switch between network uplinks when network conditions reach threshold conditions, which does not take into account the status of the user or how critical the operations of the user are.

In some embodiments, an apparatus, system, or process provides enhanced dynamic path steering for network uplinks in SD-WAN operation utilizing automatic generation of user threshold profiles. In some embodiments, path steering threshold profiles of applications are to adjust dynamically for different users. In contrast with conventional static path steering policies for each application, an enhanced dynamic path steering policy provides customized and dynamic threshold profiles for different users based on the behavior and usage pattern of each user. In this matter, an additional level of management is provided to further enrich user experience based on the respective user threshold profiles.

In some embodiments, an apparatus, system, or process is to expand dynamic path steering operation by enabling automatic generation of user scores based on factors for each user to ensure that more critical users are migrated to another uplink more quickly to maintain user experiences for such critical users. An individual user score is automatically generated for each user based on multiple factors and weights, with a final user score for each user being applied to generate a migration score for the user. The migration score for each user is then applied to dynamically generate a secondary threshold value for network conditions to trigger migration of the particular user. For example, a critical user with a higher migration score will migrate at a lower jitter value than a less critical user.

In some embodiments, a threshold policy is set for each application, and migration scores are generated (periodically or otherwise) for each user. This allows for dynamic generation of secondary threshold parameters for each user. If a user runs a particular application with a first (primary) network uplink and a network parameter value exceeds the secondary threshold value for the user and application, the user then is migrated to a second (fallback) network uplink.

As used herein, access point (AP) refers to a networking hardware device that allows devices to connect by wireless or wired connection to a network, including connection to the Internet or an intranet. The AP may connect to a router (via a wired network) as a standalone device, or may be an integral component of the router itself. An AP may include, but is not limited to, communication using any IEEE 802.11 Wi-Fi standards.

As used herein, a network gateway is a network hardware device that enables the flow of data from one network to another network. A network gateway may include multiple network uplinks.

FIG. 1 is an illustration of a network environment including a access point providing enhanced dynamic path steering, according to some embodiments. As illustrated in FIG. 1, an environment SD-WAN services includes one or more access points 110 that provide wireless or wired connections with multiple client devices. The access points 110 may be coupled with a network gateway or other network device 118, the network gateway providing multiple different network uplinks. In the illustrated example, the multiple network uplinks may include a first network uplink (Uplink-1) 112 providing a MPLS (Multi-Protocol Label Switching) link, a second network uplink (Uplink-2) 114 providing an Internet link, and continuing through an nth network uplink (Uplink-n) 116 providing a link via another communication technology, such as 4G/LTE (Long-Term Evolution) or 5G technology.

As illustrated in FIG. 1, the SD-WAN may support multiple applications, for which there may be certain user groups. For example, a first application (Application-1) 120 may include a user group including client devices 130, 132, 134, and a second application (Application-2) 125 may include a user group including client devices 140, 142, and 144, with other client devices 150 and 152 being in different operations in this example.

In some embodiments, the network gateway 118 is to provide for enhanced dynamic path steering, wherein the enhanced dynamic path steering is to provide for dynamic adjustment of parameter thresholds per user for steering of the network uplink between the multiple network uplinks 112-116. In some embodiments, the dynamic adjustment of user thresholds is based on user status and usage parameters to enhance network quality for critical usages while providing improved efficiency in overall network usage. The dynamic adjustment of user parameter thresholds is illustrated and described in more detail in FIGS. 2-6.

Figure 2:
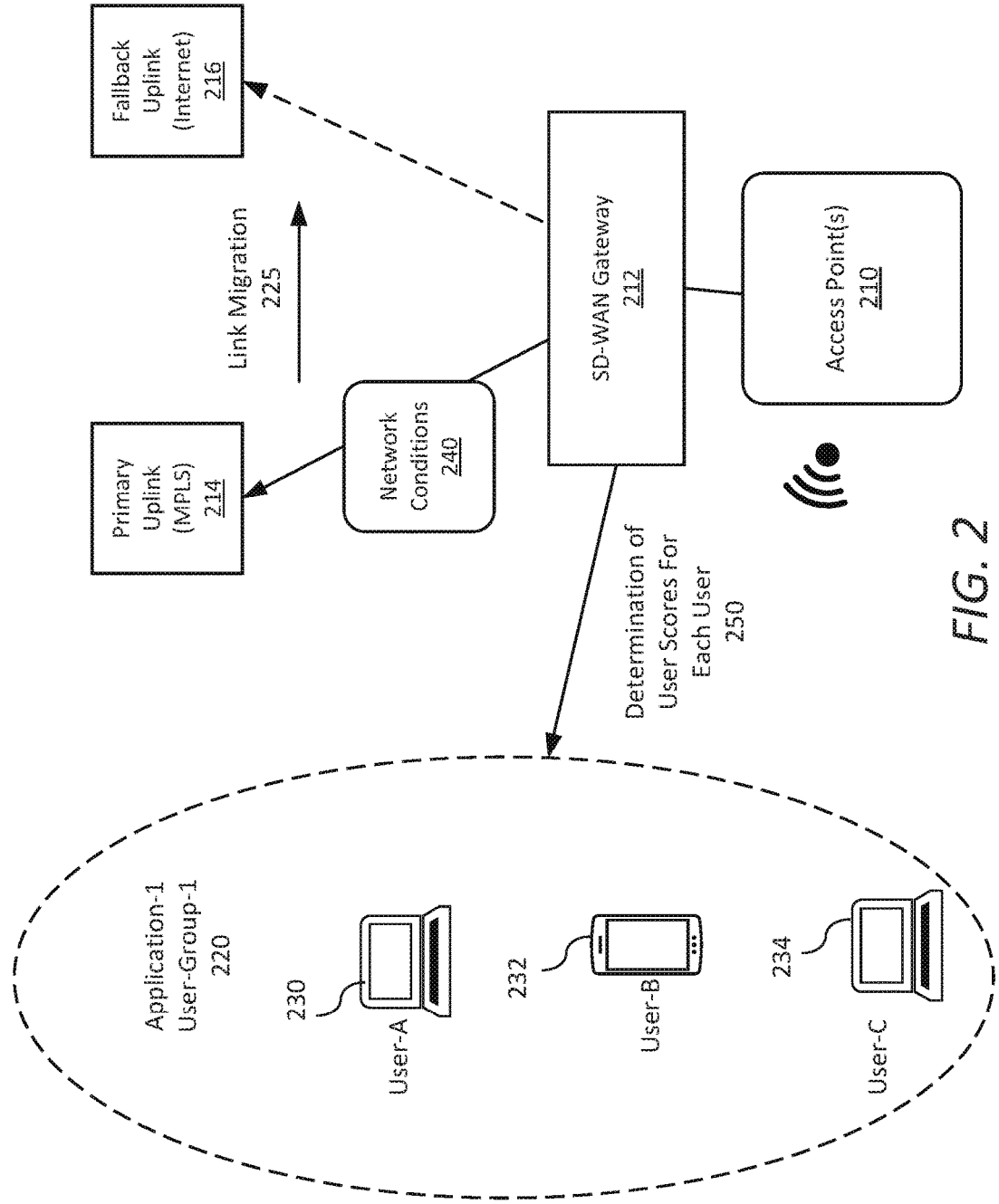
FIG. 2 is an illustration of migration between network uplinks using enhanced dynamic path steering, according to some embodiments.

FIG. 2 is an illustration of migration between network uplinks using enhanced dynamic path steering, according to some embodiments. As shown in FIG. 2, a particular application Application-1 includes User-Group-1 including client device 230 of User-A, client device 232 of User-B, and client device 234 of User-C. The client devices may be linked by wireless or wired connections via one or more access points 210. The access points may be connected with an SD-WAN Gateway 212 to provide a network connection via multiple network uplinks. A system may include additional network devices, and, for example, the access points 210 may be connected with SD-WAN gateway 212 via one or more other network devices that are not illustrated in FIG. 2, such as one or more routers.

In a particular example, Application-1 and User-Group-1 220 are assigned a primary network uplink and a fallback network uplink, such as the illustrated primary network uplink 214 (MPLS) and fallback uplink 216 (Internet), according to an application path steering policy. The application path steering policy is to be established for Application-1, providing threshold parameters for the application. Upon network conditions 240 for the primary network uplink 214 deteriorating, the path steering policy is to direct that the users migrate from the primary network uplink 214 to the fallback network uplink 216. (It is noted that, while this particular example is limited to migration from a primary network uplink to a fallback network uplink, dynamic path steering policies are not limited to this structure, and may include more complex examples in which migration is provided between more than two network uplinks depending on the network conditions.)

For example, threshold parameter values established for Application-1 according to the dynamic path steering policy may be as follows in Table 1 for a particular user group.

TABLE 1

| DPS Threshold Parameter Values | | | | | |
| --- | --- | --- | --- | --- | --- |
| APP | Users | Thresh Jitter (μsec) | Thresh Bandwidth (%) | Thresh Packet Loss (%) | Thresh Latency (μsec) |
| App-1 | A, B, C, D, E | 150 | 10 | 0.75 | 200 |

In some embodiments, rather than applying the application thresholds in Table 1 to each user, an enhanced dynamic steering policy is applied to enable generation of dynamic threshold profiles for each user. In some embodiments, the system is to generate user scores for each user 250, and utilize such user scores to modify the thresholds for each user to allow each user to transition from the primary network uplink 214 to the fallback network uplink 216 upon conditions that are appropriate for the status and operations of each user.

Figure 3:
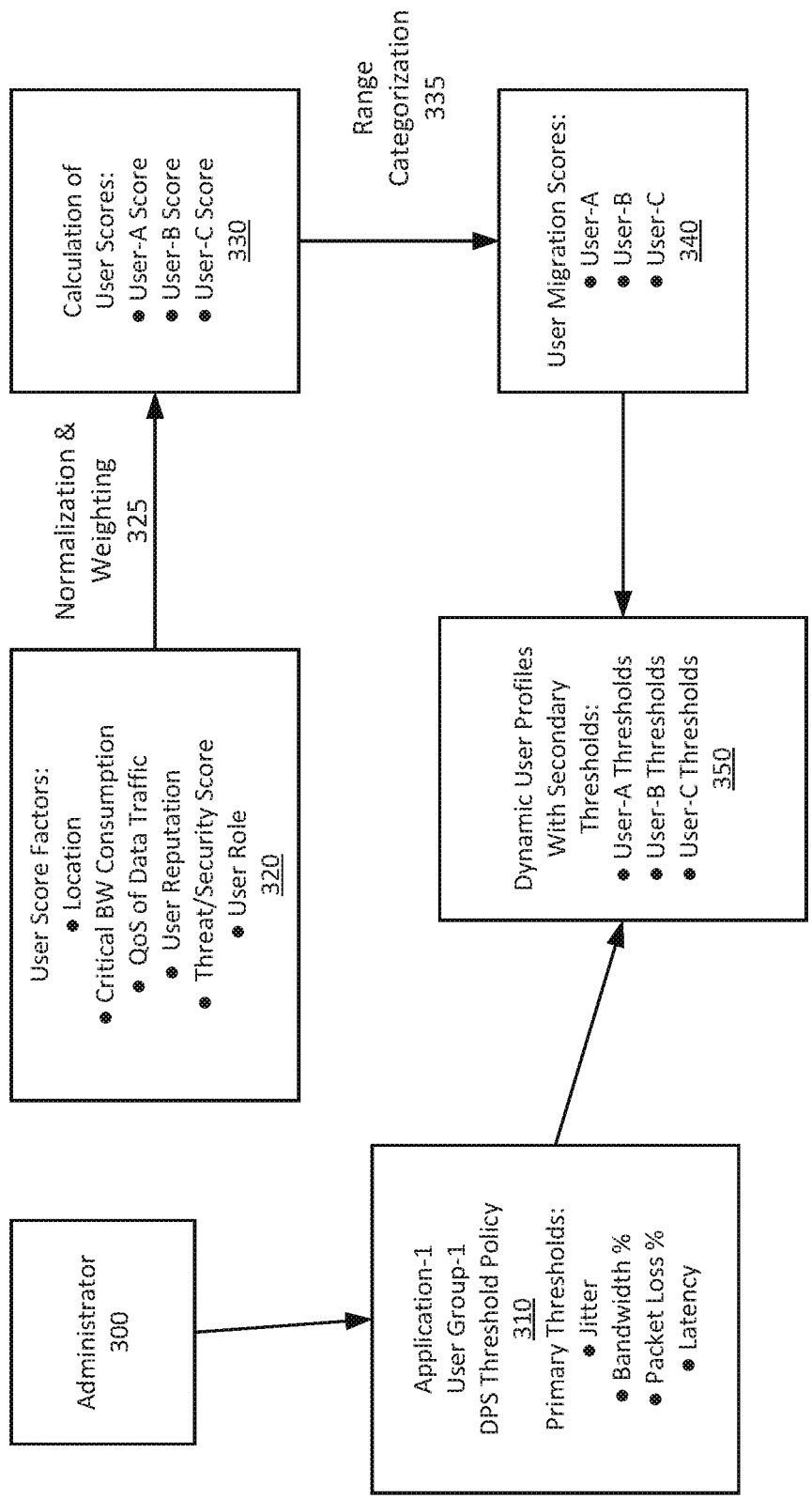
FIG. 3 is a diagram to illustrate enhanced dynamic path steering according to some embodiments.

FIG. 3 is a diagram to illustrate enhanced dynamic path steering according to some embodiments. As illustrated in FIG. 3, an administrator or other person is to establish a DPS threshold policy 310 for Application-1 with regard to User-Group-1. The primary thresholds may include, but are not limited to, jitter, bandwidth percentage, packet loss, and latency.

In some embodiments, a system is to determine user score factors 320 for each relevant user, wherein the factors may include, but are not limited to, the following factors:

(1) Location: High priority location indicates the physical location where critical business tasks are executed. High priority locations (Sales Team, CEO office, Technical Support Team Area) may be identified by the administrator or taken from. for example, a visualRf floor map plan, if available. Users in high priority locations are assigned a higher score. More important resources are more sensitive to network outages, and are allocated higher user location scores.

(2) Bandwidth Consumption: Priority may include bandwidth consumption by critical versus non-critical applications. This is based on percentage of critical applications and percentage of bandwidth used by non-critical applications. A user bandwidth score is a representation of user behavior in accessing business critical and non-business critical applications. The user score may be calculated as, for example, a weighted combination of a percentage of bandwidth consumed by critical applications versus a percentage of bandwidth for non-critical applications. For example, the user bandwidth score may be allocated as follows:

> User bandwidth score=0.7×Percentage of bandwidth consumed by critical applications+0.3×Percentage of bandwidth consumed by non-critical applications Where:

> Percentage of bandwidth consumed by critical applications of each user=(Total bandwidth consumed by critical applications of user)/(#total bandwidth consumed by critical applications of user+# total bandwidth consumed by non-critical applications of user)

(3) QoS of Data Traffic: This factor takes into consideration the QoS (Quality of Service) flow indicators given by the IP TOS/DSCP values. A user whose data traffic is primarily directed to high priority queues will have a higher user QoS score. For example:

> Interface_qos_score=Σservice_type_weight×percentage_of_packets_in_class_type

In such calculation, weightage can be allocated to different service types as defined in, for example, DSCP (Differentiated Services Code Point) RFC 4594 ("Configuration Guidelines for DiffServ Service Classes"). The weights are implementation specific, and may be assigned in an algorithm as per choice of implementation.

(4) User Reputation: The reputation of the user may be computed based on content accessed by the user. This may also take include the following parameter as and input:

Input: IP address, Time & day of the request & response, Web category, Web-reputation, File type, Content type, Bandwidth utilize.

Web Category/Web reputation may be computed by searching for certain known patterns in different fields (such as user-agent, IP, domain etc.) and scoring these (such as by Webroot Brightcloud®) to determine the IP reputation. If the content accessed is high for an application but, for example, most of the Bytes (bandwidth) are consumed by sports, shopping, or similar categories, then the user should be allocated less weight. This can be achieved by assigning relative weight to each category.

In some embodiments, a user reputation score can be generated based on a mathematic formulation or machine learning modeling of the above factors, or any other related factors. An example of user reputation may be as described in U.S. Patent App. Pub. No. 2016/0036833.

In some embodiments, a user reputation score may be calculated as follows:

> User_reputation_score=($a$×$w$ app+$m$×$w$ url+$f$×$w$ file+$i$×$w$ ids+$d$×$w$ dlp)

Where:
  "aa" denotes a total number of unpermitted applications accessed by the client
  "m" denotes a total number of malware URL requests issued by the client
  "f" denotes a total number of banned file attachments and/or MIME types used in emails by the client
  "i" denotes a total number of anomalous intrusions detected for the client
  "d" denotes a total number of sensitive data breaches detected for the client
  "w" denotes a weight assigned for each class (5) User Threat/Security Score: A user threat score may be calculated based on the events related to the individual user (severity, confidence score, stage) and the cross-event correlation information (e.g., the stage change across events) of associated devices or network. Event generation may be performed by tagging the data flow, which can be based on: (a) Rule based cases, for example, DGA (Domain Generation Algorithms), HTTP (Hypertext Transfer Protocol) header order detection, bit torrent, etc., or (b) 3rd-party data correlation-based cases, such as, for example, IOC (Indicators of Compromise), FireEye, or other data.

Examples of relevant events for user threat scoring are DNS (Domain Name System) Exfiltration/DNS-Dictionary-DGA, HTTP header misspelling/disordering, SSL (Secure Sockets Layer) expired Certificate/SSL-Inactive-Certificate, Suspicious-PDF, spyware/adware access on user's devices, hacker's tool on the device, and similar events. From the events, the following feature may be extracted for calculating the threat score:

> Entity_Threat_Score=0.5×maximum_event_score+ 0.25×attack_stage_feature+0.15×total_score_feature+0.10×detection_type_feature Where:
  Maximum Event Score: max (event_score) Assigned to user if at least hits one or a few high-severity high-confidence events
  Attack Stage Feature: # of attack stages hit by the user/total # of attack stages
  Detection Type Feature: # of detection types hit by the user/total # of detection types
  Total Score Feature: sum (event_scores)/max(sum (event_scores) of all users)

(6) User Role: A user role score may be assigned to each role in an organization (for example, in a corporate context, CEO=0.8, senior vice president=0.6, executive level=0.5, etc.), with a guest user being assigned a minimum score. Different roles can have a same user role score (e.g., a researcher can have the same score as a developer) based on the critical nature of each role. This information can be obtained for each user through, for example, an Identity and Access Management product.

In some embodiments, all factor scores for users are normalized 325 by a Z-score or any mathematical variant before calculating the score. This assists in detecting outliers and comparison between independent features. Z-score may be changed to percentile scale to provide a range between 0-1 with the help of probability density functions. For example:

$$X\text{-Normalized}=(x-\mu)/s$$

Where:
  $\mu$=mean of the population.
  $s$=standard deviation of the population The user scores 330 for each user then may be calculated based on the individual factor scores for the user, such as the following:

> User Score=$w1$×$L$user+$w2$×$B$user+$w3$×$Q$user+$w4$× $RP$user+$w5$×$T$user+$w6$×$RL$user In this calculation of user scores, w1, w2, w3, w4, w5, w6, w7 are weights related to respective parameters subjected to condition w1+w2+w3+w4+w5+w6+w7=1, and each weight value is between zero and 1, i.e., 0<$w_n$<1. The following are the values utilized in this example:
  Luser=Normalized location of the user [0, 1]
  Buser=Normalized score based on Bandwidth [0, 1]

Quser=Normalized score based on QoS queues [0, 1]

RPuser=Normalized user Reputation value [0, 1]

Tuser=Normalized threat score [0, 1]

RLuser=Normalized score based on role [0, 1]

The score calculations 330 is open and versatile, and weightages can be assigned 0 if a particular parameter is removed from consideration of score calculation. In a particular example, a set of users may have the user score calculations indicated in Table 2.

TABLE 2

User Score Calculation Examples

| User | User Score Calculation $w1 \times \text{Luser} + w2 \times \text{Buser} + w3 \times \text{Quser} + w4 \times \text{RPuser} + w5 \times \text{Tuser} + w6 \times \text{RLuser}$ | Final Score |
|---|---|---|
| A | $0.2 \times 0.2 + 0.4 \times 0.7 + 0.2 \times 0.6 + 0.2 \times 0.6 + 0.4 \times 0.5 + 0.2 \times 0.4$ | 0.84 |
| B | $0.2 \times 0.1 + 0.4 \times 0.6 + 0.2 \times 0.4 + 0.2 \times 0.5 + 0.4 \times 0.3 + 0.2 \times 0.2$ | 0.70 |
| C | $0.2 \times 0.1 + 0.4 \times 0.2 + 0.2 \times 0.2 + 0.2 \times 0.1 + 0.4 \times 0.1 + 0.2 \times 0.2$ | 0.24 |
| D | $0.2 \times 0.3 + 0.4 \times 0.8 + 0.2 \times 0.5 + 0.2 \times 0.7 + 0.4 \times 0.6 + 0.2 \times 0.3$ | 0.92 |
| E | $0.2 \times 0.1 + 0.4 \times 0.1 + 0.2 \times 0.1 + 0.2 \times 0.1 + 0.4 \times 0.1 + 0.2 \times 0.1$ | 0.16 |

In some embodiments, the user scores 330 may then be subjected to range categorization 335 to generate user migration scores 340. Based on the user score, users may be grouped into n categories to avoid the need for a large number of DPS threshold policies for large multi-user application. More specifically, there are as many user profiles per applications as the number of user categories defined in the implementation. Each category has a user migration score allotted to itself. For example: users may be categorized in following categories:

TABLE 3

User Score Calculation Examples

| User Score | Category | Migration Score |
|---|---|---|
| 0 < score < 0.1 | Cat_0 | 0.0 |
| 0.1 < score < 0.2 | Cat_1 | 0.01 |
| 0.2 < score < 0.3 | Cat_2 | 0.02 |
| 0.3 < score < 0.4 | Cat_3 | 0.03 |
| 0.4 < score < 0.5 | Cat_4 | 0.04 |
| 0.5 < score < 0.6 | Cat_5 | 0.05 |
| 0.6 < score < 0.7 | Cat_6 | 0.06 |
| 0.7 < score < 0.8 | Cat_7 | 0.07 |
| 0.8 < score < 0.9 | Cat_8 | 0.08 |
| 0.9 < score < 1.0 | Cat_9 | 0.09 |

It is noted that the range of user categories and the migration scores selected are a matter of implementation, and may vary from the above example as deemed appropriate by a developer. In the above example, 1/n is selected for the category and 0+0.1×n is selected as the migration score for each category. Using this example, a particular set of users may have the following user migration scores in Table 4 utilizing the user scores provided in Table 2.

TABLE 4

Migration Scores for Example Users

| User | User Score (Table 2) | Category Classification | Migration Scores |
|---|---|---|---|
| A | 0.84 | 8 | 0.08 |
| B | 0.70 | 7 | 0.07 |
| C | 0.24 | 2 | 0.02 |
| D | 0.92 | 9 | 0.09 |
| E | 0.16 | 5 | 0.01 |

In some embodiments, the generated migration scores are applied with the primary thresholds to generate secondary thresholds for each user 350. The secondary threshold values for uplink health parameters (jitter, latency, packet loss, bandwidth utilization) per user may be generated as follows:

Input: (i) User category classification determined for each user; and (ii) Threshold policy defined per application.

Output: Threshold polices per user categories for a user.

In some embodiments, a secondary threshold algorithm provides the following:

(i) Defining a Max value for threshold for an application: For each network uplink, the value of jitter, latency, packet loss, and bandwidth utilization in the primary threshold is applied as the maximum value.

(ii) Defining a Min value for the threshold: To determine the minimum value for the threshold for the application, baselining may be performed on the predefined period for network uplink characteristics. The baselining algorithm provides the most common behavior/values of any metric (such as the most common value over a certain time period) and excludes rare phenomena.

Once the baseline values for a metric (in this case jitter, latency, packet loss, and bandwidth utilization) are learned for a WAN uplink, these may be utilized to calculate the threshold value for applications to be switched over to other network uplinks.

In some embodiments, to determine the secondary threshold values 350 for application per user, a difference between the minimum values and maximum values is calculated and then multiplied by the migration score of each user category, with the result then subtracted from the maximum (current threshold parameter) value in order to produce a sharper threshold.

For example, to calculate the dynamic user threshold for jitter for a particular application based on an embodiment of a calculation algorithm:

Secondary Threshold=Max Jitter(threshold jitter)−
(Max Jitter−Baselined Jitter×Migration_Score Utilizing this process, the user category of an application will follow the dynamic path steering for link selection decision based on the secondary threshold value that is dynamically calculated with user's behavior. In an example, the secondary thresholds for individual users may be calculated as shown in Table 5.

TABLE 5

Secondary Jitter Threshold for Individual Users

| User | Migration Scores | Primary Jitter Threshold | Secondary Jitter Threshold |
|---|---|---|---|
| A | 0.08 | 150 | 150 − (150 − 106.87) × 0.05 = 146.55 |
| B | 0.07 | 150 | 150 − (150 − 106.87) × 0.05 = 146.98 |

TABLE 5-continued

Secondary Jitter Threshold for Individual Users

| User | Migration Scores | Primary Jitter Threshold | Secondary Jitter Threshold |
|---|---|---|---|
| C | 0.02 | 150 | 150 − (150 − 106.87) × 0.05 = 149.13 |
| D | 0.09 | 150 | 150 − (150 − 106.87) × 0.05 = 146.11 |
| E | 0.01 | 150 | 150 − (150 − 106.87) × 0.05 = 149.56 |

As illustrated in Table 5, the application threshold policy is customized for users based on various parameters. This customization may be utilized to provide added control over the network uplink threshold policy, and assist in optimizing the user experience.

Figure 4:
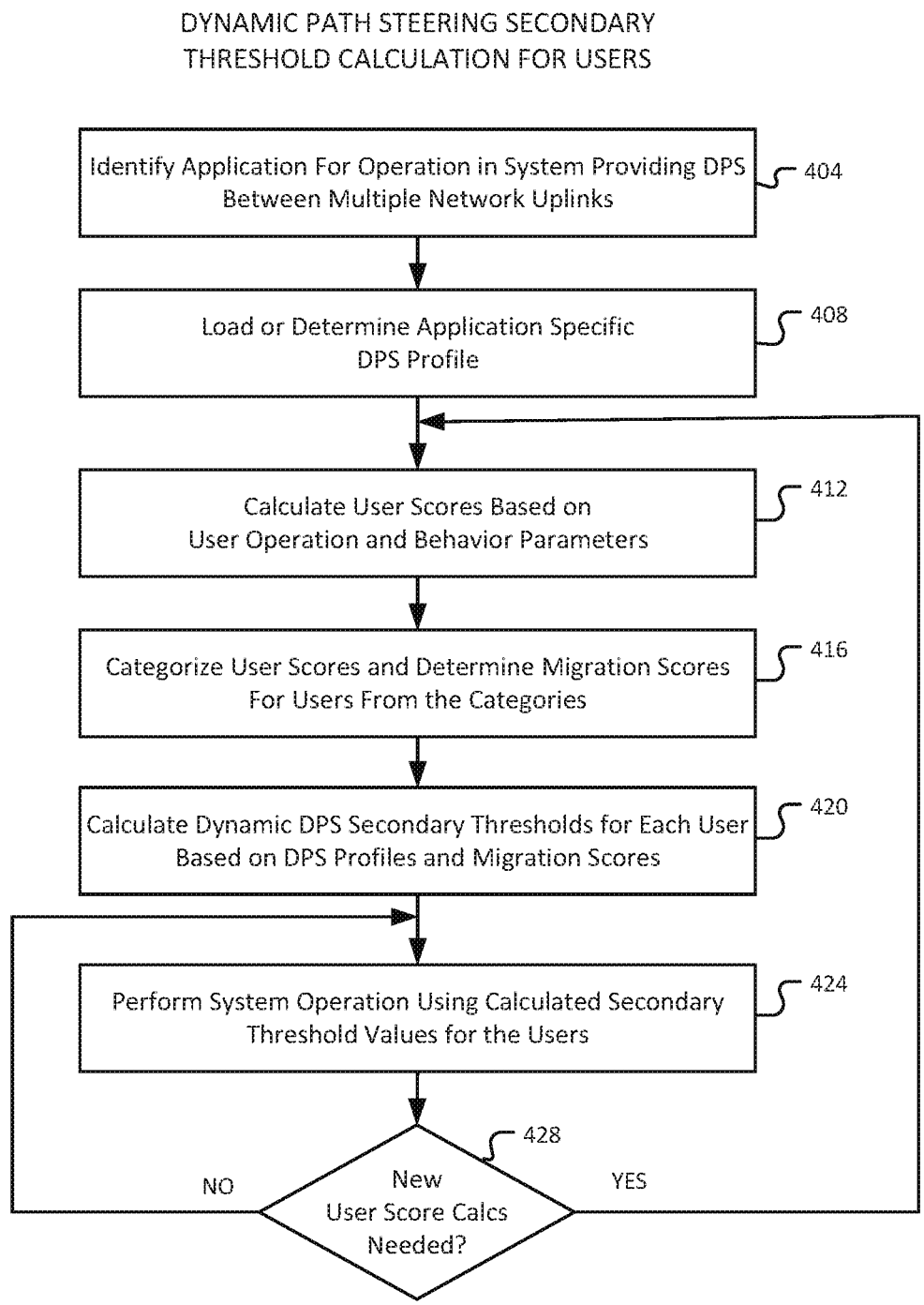
FIG. 4 is a flow chart to illustrate a process for calculation of dynamic path steering secondary thresholds for users. according to some embodiments.

FIG. 4 is a flow chart to illustrate a process for calculation of dynamic path steering secondary thresholds for users, according to some embodiments. In some embodiments, a process may include identifying an application for operation in a system that provides dynamic path steering between multiple network uplinks 404. An application specific DPS profile is then loaded (or determined) 408, the profile providing a set of parameter thresholds for the application, such as the example illustrated in Table 1.

In some embodiments, user scores are calculated based on user operation and behavior parameters 412. The user scores may, for example. be calculated as shown in Table 2. The calculation of user scores allow taking into account how critical the operations of a particular user, where the calculation may include factors such as location, critical bandwidth consumption, QoS of data traffic, user reputation, user threat/security, and user role in an organization.

The user scores may then be categorized on values and user migration scores determined based on the determined categories 416, such as illustrated in Tables 3 and 4. The user migration scores provide a mechanism to provide an advantage in network uplink migration for users that provide critical operations. In some embodiments, dynamic DPS secondary thresholds are calculated for each user based on the DPS profiles for the application and the migration scores for the users 420, such as the example calculations provided in Table 5.

Figure 5:
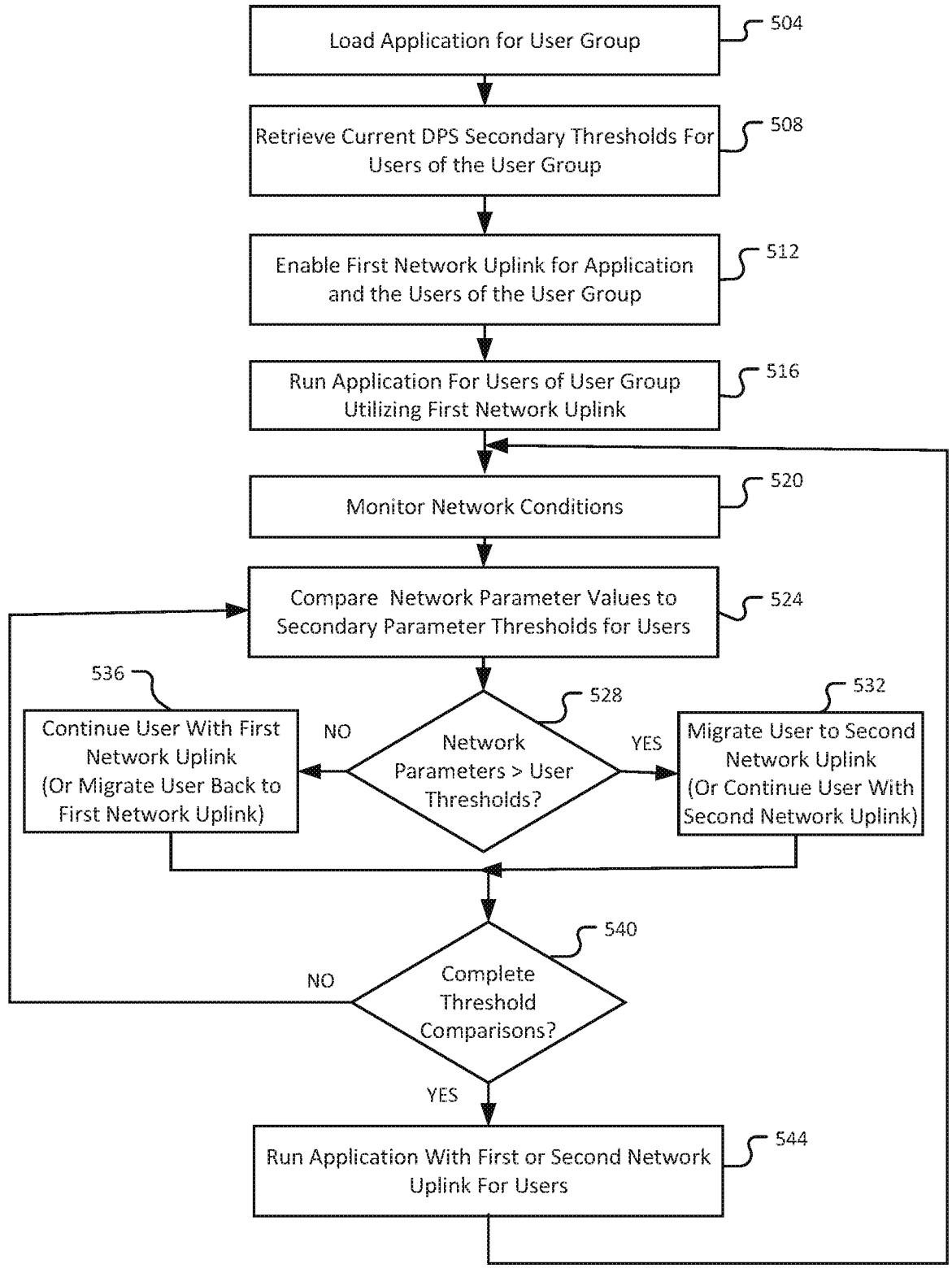
FIG. 5 is a flow chart to illustrate a process for enhanced dynamic path steering, according to some embodiments.

The process may then continue with performance of system operations using the calculated secondary threshold values 424, such as illustrated in FIG. 5. The operation thus allows for migration between network uplinks based on individual user thresholds as required to address the current network conditions.

In some embodiments, the user scores may be recalculated, which may be provided periodically, upon request, upon the occurrence of certain events, or other requirement. If new user score calculations are not yet needed 428, then the process continues with system operations using the currently calculated secondary threshold values for the user 424. Upon new user score calculations being required 428, the process may return to calculating user scores based on user operation and behavior parameters 412.

FIG. 5 is a flow chart to illustrate a process for enhanced dynamic path steering, according to some embodiments. In a system operation, a particular application may be loaded for a user group 504. The system includes multiple network uplinks, and an application profile for the application provides primary thresholds for network parameters in operation of the application. For example, the application profile may provide for migrating usage of the application from a first (primary) network uplink to a second (fallback) network uplink upon network conditions exceeding any of the network parameters.

In some embodiments, the process includes retrieving a current set of secondary thresholds for the application and the user group 508, such as determined pursuant to the process illustrated in FIG. 4. The process may include enabling a first network uplink for the application 512, as defined by the application profile, and running the application for the users of the user group utilizing the first network uplink 516.

The process may proceed with monitoring network conditions 520, and specifically monitoring whether network conditions are such that any secondary parameters for the individual users are exceeded. In some embodiments, the process may include comparing network parameter values to secondary parameter values for users 524, and determining whether any network parameter values exceed the secondary parameter thresholds for the user 518. If none of the relevant network parameter values (such as jitter, bandwidth percentage, packet loss, or latency) exceed the respective secondary parameter threshold for the user 528, then operation continues for the user with the first network uplink 536. In certain embodiments, the process may further provide for migrating the user back to the first network uplink if the user has previously migrated to the second network uplink. If one or more of the relevant network parameter values exceed the respective secondary parameter threshold for the user 528, then the process provides for migrating the user from the first network uplink to the second network uplink 532. In certain embodiments, the process may further provide for continuing the user with the second network uplink if the user has previously migrated to the second network uplink.

Upon completing the comparisons for the user secondary thresholds 540, the process may proceed with running the application with the assigned first or second network uplinks 544, and continuing with monitoring of the network conditions. In this manner, the selection of the network uplink for each user is based at least in part on how critical the operations for such user. A user group is potentially divided between primary and fallback network uplinks to ensure that critical users are provided with higher quality network connections, and to allow for improved efficiency of operations as less critical operations can remain with a primary network uplink as long as the network conditions are sufficient to meet the secondary thresholds assigned to the less critical users.

Figure 6:
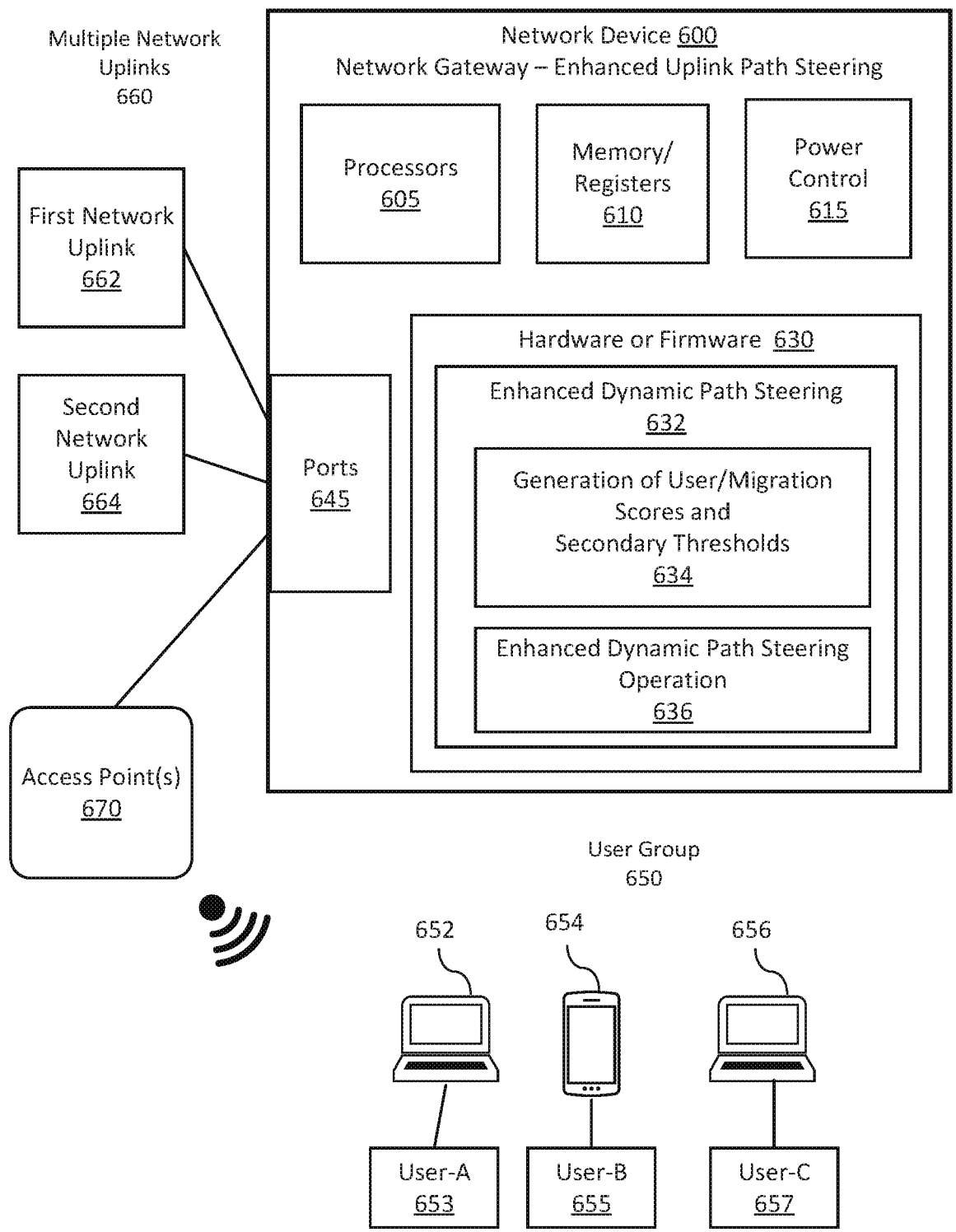
FIG. 6 is an illustration of an network device providing for enhanced dynamic path steering, according to some embodiments.

FIG. 6 is an illustration of an network device providing for enhanced dynamic path steering, according to some embodiments. In some embodiments, the network device 600, which may include a network gateway, provides for multiple network uplinks 660, which may include any number of network uplinks, such as the illustrated first network uplink 662 and second network uplink 664 shown as connected via one or more ports 645 of the network device 600. In some embodiments, the network device 600 is connected with one or more access points 670 to provide service to client devices, such as the illustrated client devices for user group 650. A system may include additional network devices, and, for example, the access points 670 may be connected with the network device 600 via one or more other network devices that are not illustrated in FIG. 6, such as one or more routers. In this example, the client devices include client device 652 of User-A 653, client device 654 of User-B 655, and client device 656 of User-C 657.

In some embodiments, the network device 600 includes hardware or firmware 630 to support enhanced dynamic path steering 630. In some embodiments, the enhanced dynamic path steering 630 includes generation of user/migration scores and secondary thresholds for users 634, such as illustrated in FIGS. 3 and 4, and enhanced dynamic path steering operation 636, such as illustrated in FIG. 5.

In some embodiments, the network device further includes one or more processors 605 for processing of data; and memory and registers 610 for storage of data, which may include volatile and nonvolatile memory (including flash memory and similar elements), registers, and other storage technologies. The memory and registers 610 may include data related to generation of user scores, migration scores, and secondary parameter thresholds for users 634, and data related to the operation of enhanced dynamic path steering 636. The network devices includes other elements required for operation, such as power control 615 and other elements that are not illustrated in FIG. 6.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, one or more non-transitory computer-readable storage mediums have stored thereon executable computer program instructions that, when executed by one or more processors, cause the one or more processors to perform operations including obtaining a threshold policy for a first application, the threshold policy including a set of one or more threshold values for operational parameters for the first application; generating a migration score for a first user, the migration score being based at least in part on a user score for the first user; generating a set of one or more secondary threshold values for the first user based at least in part on the migration score for the first user and the set of one or more threshold values for the first application; enabling operation of the first application for the first user using a first network uplink of a plurality of network uplinks; monitoring network parameter values in operation of the first application; and upon detecting an operational parameter value for the first application exceeding a first secondary threshold value of the set of secondary threshold values, migrating the operation of the first application for the first user from the first network uplink to a second network uplink.

In some embodiments, a network device includes a processor; a memory for storage of data; and ports for connection of a plurality of network uplinks, including at least a first network uplink utilizing a first communication technology and a second network uplink utilizing a second, different communication technology, wherein the network device is to provide dynamic path steering for users of one or more applications, including the network device to: obtain a threshold policy for a first application, the threshold policy including a set of one or more threshold values for operational parameters for the first application; generate a migration score for each of a plurality of users, the migration score for each user being based at least in part on a user score for the user; generate a set of one or more secondary threshold values for each of the plurality of users based at least in part on the migration score for each user and the set of one or more threshold values for the first application; enable operation of the first application for the plurality of users using the first network uplink; monitor network parameter values in operation of the first application; and upon detecting an operational parameter value for the first application exceeding a first secondary threshold value of the set of secondary threshold values for a first user of the plurality of users, migrate the operation of the first application for the first user from the first network uplink to the second network uplink.

In some embodiments, a method includes obtaining a threshold policy for a first application in an SD-WAN Software Defined Wide Area Network), the threshold policy including a set of one or more threshold values for operational parameters for the first application; generating a migration score for each of a plurality of users, the migration score for each user being based at least in part on a user score for the user; generating a set of one or more secondary threshold values for each of the plurality of users based at least in part on the migration score for each user and the set of one or more threshold values for the first application; enabling operation of the first application for the plurality of users using a first network uplink of a plurality of network uplinks; monitoring network parameter values in operation of the first application; and upon detecting an operational parameter value for the first application exceeding a first secondary threshold value of the set of secondary threshold values for a first user of the plurality of users, migrating the operation of the first application for the first user from the first network uplink to a second network uplink.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:
    obtaining a threshold policy for a first application, the threshold policy including a set of primary threshold values for operational parameters for the first application;
    generating a migration score for a first user, the migration score being based at least in part on a user score for the first user, wherein the user score is calculated based on at least two of location, bandwidth consumption, quality of service (QoS) of data traffic, user reputation, user security score, and user role;
    generating a set of secondary threshold values for the first user, wherein generating each of the set of secondary threshold values comprises:
        applying the migration score of each user as a weight to a first difference between a respective primary threshold and a respective baseline value, and
        generating each of the set of secondary threshold values as a second difference between the respective primary threshold and the weighted first difference;
    enabling operation of the first application for the first user using a first network uplink of a plurality of network uplinks;
    monitoring network parameter values in operation of the first application; and
    upon detecting an operational parameter value for the first application exceeding a first secondary threshold value of the set of secondary threshold values, migrating the operation of the first application for the first user from the first network uplink to a second network uplink.

2. The one or more storage mediums of claim 1, wherein the instructions further include instructions for:
    generating a migration score for a second user, the migration score for the second user being different than the migration score for the first user; and
    generating a second set of one or more secondary threshold values for the second user based at least in part on the migration score for the second user and the set of one or more threshold values for the first application, the second set of secondary threshold values for the second user being different than the set of secondary threshold values for the first user.

3. The one or more storage mediums of claim 1, wherein the instructions further include instructions for:
    generating the user score for the first user based on one or more factors relating to the first user.

4. The one or more storage mediums of claim 3, wherein the one or more factors relating to the first user include one or more of:
    location of operation;
    critical and non-critical bandwidth consumption;
    QoS of traffic;
    user reputation based at least in part on type of content accessed;
    a threat score based at least in part on events related to the first user; and
    priority of role of the first user.

5. The one or more mediums of claim 1, wherein the first network uplink is a primary network uplink for the first application and the second network uplink is a fallback network uplink for the first application.

6. The one or more mediums of claim 1, wherein the first network uplink utilizes a first communication technology and the second network uplink utilizes a second, different communication technology.

7. The one or more mediums of claim 1, wherein the first network uplink and the second network uplink provide network communication for a SD-WAN Software Defined Wide Area Network).

8. The one or more storage mediums of claim 1, wherein the user score is calculated based on the user reputation and at least one of location, bandwidth consumption, QoS of data traffic, user reputation, user security score, and user role.

9. A network device comprising:
a processor;
a memory for storage of data; and
ports for connection of a plurality of network uplinks, including at least a first network uplink utilizing a first communication technology and a second network uplink utilizing a second, different communication technology;
wherein the network device is to provide dynamic path steering for users of one or more applications, including the network device to:
obtain a threshold policy for a first application, the threshold policy including a set of primary threshold values for operational parameters for the first application;
generate a migration score for each of a plurality of users, the migration score for each user being based at least in part on a user score for the user, wherein the user score is calculated based on at least two of location, bandwidth consumption, quality of service (QoS) of data traffic, user reputation, user security score, and user role;
generate a set of secondary threshold values for each of the plurality of users, wherein generating each of the set of secondary threshold values comprises:
applying the migration score of each user as a weight to a first difference between a respective primary threshold and a respective baseline value, and
generating each of the set of secondary threshold values as a second difference between the respective primary threshold and the weighted first difference;
enable operation of the first application for the plurality of users using the first network uplink;
monitor network parameter values in operation of the first application; and
upon detecting an operational parameter value for the first application exceeding a first secondary threshold value of the set of secondary threshold values for a first user of the plurality of users, migrate the operation of the first application for the first user from the first network uplink to the second network uplink.

10. The network device of claim 9, wherein a migration score generated for the first user is different than a migration score generated for a second user.

11. The network device of claim 9, wherein the network device is further to:
upon detecting an operational parameter value for the first application exceeding a first secondary threshold value of the set of secondary threshold values for a second user of the plurality of users, migrating the operation of the first application for the second user from the first network uplink to the second network uplink, wherein the first user and second user are migrated to the second network uplink at different operational parameter values for the first application.

12. The network device of claim 9, wherein the network device is further to:
generate the user score for each user of the plurality of users based on one or more factors relating to each user.

13. The network device of claim 9, wherein the network device is a network gateway.

14. The network device of claim 9, wherein the plurality of network uplinks include one or more of Internet, MPLS (Multi-Protocol Label Switching), 4G/LTE (Long-Term Evolution), or 5G communication technology.

15. The network device of claim 9, wherein the network device provides support for an SD-WAN Software Defined Wide Area Network).

16. A method comprising:
obtaining a threshold policy for a first application in an SD-WAN Software Defined Wide Area Network), the threshold policy including a set of primary threshold values for operational parameters for the first application;
generating a migration score for each of a plurality of users, the migration score for each user being based at least in part on a user score for the user, wherein the user score is calculated based on at least two of location, bandwidth consumption, quality of service (QoS) of data traffic, user reputation, user security score, and user role;
generating a set of secondary threshold values for each of the plurality of users, wherein generating each of the set of secondary threshold values comprises:
applying the migration score of each user as a weight to a first difference between a respective primary threshold and a respective baseline value, and
generating each of the set of secondary threshold values as a second difference between the respective primary threshold and the weighted first difference;
enabling operation of the first application for the plurality of users using a first network uplink of a plurality of network uplinks;
monitoring network parameter values in operation of the first application; and
upon detecting an operational parameter value for the first application exceeding a first secondary threshold value of the set of secondary threshold values for a first user of the plurality of users, migrating the operation of the first application for the first user from the first network uplink to a second network uplink.

17. The method of claim 16, wherein a migration score generated for the first user is different than a migration score generated for a second user.

18. The method of claim 16, further comprising:
upon detecting an operational parameter value for the first application exceeding a first secondary threshold value of the set of secondary threshold values for a second user of the plurality of users, migrating the operation of the first application for the second user from the first network uplink to the second network uplink, wherein the first user and second user are migrated to the second network uplink at different operational parameter values for the first application.

19. The method of claim 16, further comprising:
generating the user score for each user of the plurality of users based on one or more factors relating to each user.

20. The method of claim 16, further comprising:
upon detecting that all operational parameter values for the first application are within secondary threshold values of the set of secondary threshold values for the first user, migrating the operation of the first application for the first user back from the second network uplink back to the first network uplink.

21. The method of claim 16, wherein the plurality of network uplinks include one or more of Internet, MPLS (Multi-Protocol Label Switching), 4G/LTE (Long-Term Evolution), or 5G communication technology.

* * * * *